United States Patent [19]

Amort et al.

[11] Patent Number: 4,490,526

[45] Date of Patent: Dec. 25, 1984

[54] METHOD FOR THE MODIFICATION OF STARCH IN THE PRESENCE OF SOLVENTS

[75] Inventors: Jürgen Amort, Troisdorf-Sieglar; Horst Hanisch, Hennef; Ute Klapdor, Troisdorf, all of Fed. Rep. of Germany; Hans P. Suerken, Zaltbommel; Hendrikus van der Maas, Zuilichem, both of Netherlands

[73] Assignee: Dynamit Nobel AG, Cologne, Fed. Rep. of Germany

[21] Appl. No.: 606,709

[22] Filed: May 3, 1984

[30] Foreign Application Priority Data

May 5, 1983 [DE] Fed. Rep. of Germany ....... 3316395

[51] Int. Cl.³ .............................................. C08B 31/00
[52] U.S. Cl. ...................................... 536/102; 536/45; 536/48; 536/50; 536/107; 536/111
[58] Field of Search ..................... 536/45, 48, 50, 102, 536/107, 111

[56] References Cited

U.S. PATENT DOCUMENTS

| | | | |
|---|---|---|---|
| 3,071,492 | 1/1963 | Satterly | 536/102 |
| 3,251,748 | 5/1966 | High et al. | 536/102 |
| 3,385,835 | 5/1968 | Kugler et al. | 526/11.2 |
| 3,398,015 | 8/1968 | Buckler et al. | 536/111 |

FOREIGN PATENT DOCUMENTS 770089 3/1957 United Kingdom ................ 536/102

Primary Examiner—Ronald W. Griffin
Attorney, Agent, or Firm—Felfe & Lynch

[57] ABSTRACT

A method for the modification of starch by silanes wherein the starch and silane are contacted in an organic solvent in the presence of a metallic acid ester of a metal of groups IVB or VB of the Periodic Table of the elements. The resulting suspension is stirred. The subsequently separated starch exhibits better working characteristics than the corresponding unmodified starch.

6 Claims, No Drawings 4,490,526

METHOD FOR THE MODIFICATION OF STARCH IN THE PRESENCE OF SOLVENTS

BACKGROUND OF THE INVENTION

The subject matter of the present invention is a method for the modification of starch with organofunctional alkoxysilanes and alkylalkoxysilanes in the presence of organic solvents. The modified starch obtained by this method contains the organosilane in bound form and can be used directly for known applications.

It is known, for example, from U.S. Pat. No. 3,398,015 to produce self-supporting films from amylose, and to improve the properties of these films by treatment with alkyl chlorosilanes.

It is furthermore known to use starch as a filler in polymers, e.g., in urethane resins (see for example EP-A1 No. 0,058,921). Starch is known as a filler in other thermoplastics as well, such as polyolefins, for example, or also in elastomers (cf. Shell Polymers, Vol. 5, No. 3 (1981), pp. 73 to 78). Starch derivatives such as the ethers or esters, for example, are also used as fillers. It has also been proposed to use fillers made of starch derivatives containing silicones; in this case, however, the starch is merely mixed with the silicone, so that naught but a mixture of starch and silicone is involved, in which the silicone is not bound to the starch.

When starch is used as filler, it is to have both an oleophilic surface and reactive centers which improve its incorporation into the polymer and its adherence to the latter. For this purpose, organosilanes are used as adhesivizers between polymers and inorganic fillers, and in this case the fillers can also be modified fillers. The modification is performed by causing the fillers to react with the organosilane by putting the filler in contact with the organosilane directly or dissolved in a solvent. Additional reactivizers or catalysts are unnecessary in this reaction.

Now, if by analogy to this known modification to inorganic fillers for polymers, the attempt is made to modify starch with organofunctional alkoxysilanes and alkylalkoxysilanes which are dissolved in a solvent, the desired results are not obtained: The named alkoxysilanes dissolved in solvents react poorly or not at all with starch; modification of the starch does not occur, and the organosilane contained in the solvent merely adheres superficially to the starch.

Consequently, on the basis of the need perceived in practice of modifyibng starch with silanes, the problem existed of finding a method of fixing organofunctional alkoxysilanes and alkylalkoxysilanes out of solvents onto starch. The starch must then have reactive centers which, for example on the basis of the organofunctional radicals in the case of organofunctional alkoxysilanes, are able to react in a known manner with functional groups of polymers, or which cause the starch, on the basis, for example, of the alkyl radicals of alkoxysilanes, to become highly hydrophobic, resulting in good dispersibility and a uniform distribution of the starch in the polymer.

THE INVENTION

As a solution of this problem, a method has been found for the modification of starch with organosilanes, which is characterized by bringing starch into intimate contact with an organofunctional alkoxysilane or an alkylalkoxysilane in an organic solvent, in the presence of metallic acid esters of metals of Groups IVB and VB of the periodic table.

The method of the invention is practiced by dissolving the organosilane and the metallic acid ester in the solvent, suspending the starch in this solution, and then seeing to it that the starch is kept in constant movement. Preferably the suspension is stirred, to obtain a good intermixture. In general, after stirring for about two hours, the amount of silane corresponding to the batch size has reacted with the starch to form the modified starch.

The modified starch obtained in accordance with the invention is worked up by methods known in themselves, by separating the starch and then, if desired, washing with the solvent and drying. If impurities are kept out during the procedure, no washing is necessary. Proof that the starch has reacted with the silane is generally obtained by determining the silicon content. This is based on the fact that, theoretically, no more than one mole of organosilane can react for each free hydroxyl group in the starch. In practice, however, lesser amounts of organosilane will suffice to provide the starch with the above-named properties. Analogous to starch derivatives, the amount of organosilane that has reacted with the starch is determined as degree of substitution (DS). This degree of substitution should be at least around 0.001. Good results are obtained beginning at a degree of substitution of 0.003. Considerably higher degrees of substitution can also be achieved by the method of the invention, although the silane yield may then be smaller.

For the reaction between the starch and the organosilane, it is preferable to use dilute solutions of the organosilanes. The organosilane reacts with the starch out of solutions as weak as 0.1%; concentrated solutions up to a concentration of 50% can also be used, but if highly concentrated solutions are used, a smaller percentage of the silane reacts with the starch than in the case of the dilute solutions.

The organosilane solutions are prepared in a manner known in itself. The amount of silane corresponding to the desired degree of substitution is stirred into the solvent, and the desired solutions are thus formed. The metallic acid ester is then stirred into the clear solution of the organosilane. In general, the metallic acid ester is also soluble in the organic solvents that can be used, so that a homogeneous solution is obtained. The starch is then suspended in this solution. The amount of solvent is to be selected such that, an easily stirrable suspension is formed.

The reaction between the organosilane and the starch takes place even at room temperature. It can be performed, however, also at elevated temperatures.

The modification of the starch is performed in accordance with the invention either with native starch or with starch derivatives. The native starch can be a starch obtained from vegetables or grains, or from tubers or root crops. For example, wheat starch, cornstarch, potato starch or rice starch can be used in accordance with the invention. The starch derivatives which can be modified according to the invention are mainly esters and ethers of the above-named kinds of starch, as well as oxidized starches. Cationized starches can also be used.

The organosilanes which can be used as modifying agents in accordance with the invention include alkyl alkoxysilanes and organofunctional alkoxysilanes. They can be characterized by the general formula

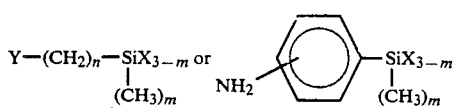

wherein Y represents a substituted or unsubstituted amino group or a moiety from the group

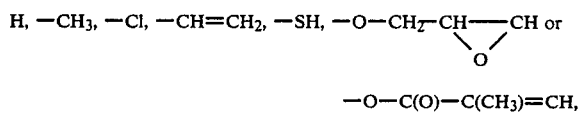

$$-O-C(O)-C(CH_3)=CH,$$

X is an alkoxy moiety having no more than 6 carbon-atoms, interrupted, if desired, by oxygen atoms, m can assume a value of 0 or 1 or 2, and n can assume the value of 1 or 2 or 3, as well as 0 in the case in which Y=—CH=CH$_2$. The substituents for the amino group can be C$_1$-C$_8$ alkyl moieties, aryl moieties, preferably the phenyl radical, cycloalkyl moieties, and the group —CH$_2$—CH$_2$NH$_2$. The amino group can also be in the form of a quaternary ammonium salt. In no case the —NH$_2$—group or halogen is bound directly to the silicon atom.

The general formula embraces alkyl silanes, such as methyl trimethoxysilane, methyl triethoxysilane, propyl trimethoxysilane, butyl trimethoxysilane, and isobutyl trimethoxysilane. The following are given as examples of organofunctional silanes: vinyltrimethoxysilane, vinyltriethoxysilane, vinylmethyldimethoxysilane, γ-chloropropyltrimethoxysilane, γ-chloropropylmethyl-dimethoxysilane, vinyl-tris-methoxi-ethoxisilane, vinyl-tris-ethoxi-ethoxisilane, α-chloromethyldimethylmethoxysilane, γ-mercaptopropyltrimethoxysilane, γ-mercaptopropylmethyldimethoxysilane, γ-aminopropyl-trimethoxysilane, γ-aminopropyltriethoxy silane, γ-aminopropylmethyldiethoxysilane, γ-aminoethylaminopropyltrimethoxysilane, aminophenyltrimethoxisilane, γ-glycidyloxypropyltrimethoxysilane, γ-methacryloxypropyltrimethoxysilane.

The concentration of the silanes in the organic solvents will depend on, among other things, the degree of substitution that is to be achieved, and the workability of the suspension of the starch in the selected solvent. Concentrations between 0.1 and 0.5% by weight will suffice; basically, however, higher concentrations can also be used. It is desirable always to dissolve in the solvent the amount of silane which is to react with the starch, and to select the quantity of the solvent such that it will form with the starch an easily workable and stirrable suspension.

Suitable solvents are either polar or nonpolar solvents. The preferred solvents are polar solvents, which are used especially because of the moisture content of the starch, as, for example, alcohols, preferably the alcohols corresponding to the ester component of the metallic acid ester or corresponding to the alkoxy group of the silane.

The metallic acid esters that can be used include the esters of metallic acids of the elements of groups IVB or VB of the periodic table of the elements, chiefly titanic, zirconic and vanadic acid esters. The ester component can be derived either from aliphatic alcohols or from phenols which can be alkyl-substituted if desired. Mixed esters can also be used. The compounds which can be used in accordance with the invention include, among other, methyl titanate, ethyl titanate, butyl titanate, butyl polytitanate, nonyl titanate, cetyl titanate, tributyl alkyl titanate, cresyl titanate, cresyl polytitanate, propyl zirconate, butyl zirconate, ethyl vanadate, and butyl vanadate.

Also usable in accordance with the invention are mixed esters in which one or more alkoxy groups are replaced by a complexing agent such as acetylacetone, for example, as in the case of diisopropoxy-bis(2,4-pentandionato)-titanium(4), also known by the name of titanium acetylacetonate. Other acetylacetonates which do not contain ester groupings can also be used.

The ratio of silane to metallic acid ester can vary widely, depending on which silanes and which solvents are used, and how high the degree of substitution is to be. Generally, this ratio is between 9:1 and 1:9, but even lesser amounts of certain metallic acid esters produce the effect in accordance with the invention.

The starch modified in accordance with the present method is not wetted by cold water than alkyl silanes and a number of organofunctional silanes are used as modifying agents. It is nevertheless soluble in hot water.

The starches modified in accordance with the invention, by the use of a large amount of organosilane as modifying agents, have a good free-flowing quality which is considerably better than is achieved by the addition of highly porous silica, while unmodified starches are hardly capable of flowing. This improvement occurs mainly in the case of potato starch, but other kinds of starch, when modified with alkyl silanes, have improved flowing qualities.

The aqueous solutions of the starches modified in accordance with the invention can have a higher viscosity than the pure starches, but this does not result in any disadvantage in the stirring or dispersing of fillers.

On the basis of the above-named properties, the modified starches prepared by the method of the invention are suitable especially for those applications of starch in which native starches and derivative starches do not fully satisfy existing requirements. An example is the use of starch as binder for mineral fibers, as textile adjuvants, as adhesives for various paper applications, and as fillers for plastics.

EXAMPLES

Example 1

A solution of 0.74 g (=0.0045 mol) of propyltrimethoxysilane (PTMO) and 0.185 g (=0.00054 mol) of butyl titanate monomer (BTM) in 610 ml of hexane was prepared. The quantity ratio of PTMO to BTM was 80:20. Then 193.8 g (=1 mol) of potato starch waas added and the mixture was stirred at room temperature for at least 30 minutes. It was then let stand for about 20 hours, and then the starch was filtered and dried at room temperature. The silicon content of the starch obtained in this manner was 0.036%, i.e., about 46.2% of the amount of silane available was fixed by the starch. The silanized starch was subject to a wetting test in which a spatula tip of starch was placed onto distilled water in a reagent glass. The entire amount of the starch remained afloat on the water for at least 24 hours. The flowing quality of another sample was determined in the Ford beaker, after being first sifted. The time it took to flow out from the 6 mm nozzle was 33 seconds.

For comparison, potato starch was treated in the same manner with the same amount of propyltrimethoxysilane, but without the addition of BTM. The starch treated in this manner had a silicon content of only 0.017% (=21.8% of the available silane, but it was completely wetted by water, i.e., it sank immediately to the bottom in the wetting test, and could not flow at all. A test with 9.84 g (=0.06 mol) of PTMO without the addition of butyl titanate monomer produced no better result.

Example 2

Potato starch was treated in the same manner as in Example 1. However, perchloroethylene was used as the solvent (610 ml in one test, and 250 ml in a second). Also, for better air-drying, the product was dried in an oven for 2 hours at 40° C. after filtration. The same applies to all the following examples, in which the treatment was performed in perchlorethylene or isopropanol. The analyses produced the findings listed in the following table:

|  | Silane absorption per 100 g of starch | | |
|---|---|---|---|
|  | Theoretical % of Si | Found % of Si | % of theory |
| Test performed in 610 ml of perchlorethylene | 0.078 | 0.042 | 53.8 |
| 250 ml of perchlorethylene | 0.078 | 0.038 | 48.7 |

Both samples were additionally subjected to the wetting test. The entire amount of starch placed on the water remained floating on its surface for at least 24 hours.

The pouring test in the Ford beaker was determined for both products. In the case of the test in 610 ml of solvent, the pouring time was 30 seconds, and it was 32 seconds for the 250 ml in the other test.

Example 3

The procedure of Examples 1 and 2 was repeated, except that, instead of hexane (Example 1) and perchloroethylene (Example 2), a polar solvent was used, namely 610 ml of isopropanol.

The result of the wetting test on the starch obtained was the same as in Examples 1 and 2, and the pouring time amounted to about 30 seconds.

Example 4

The procedure was similar to Example 2, but the ratio of propyltrimethoxysilane to butyl titanate monomer was varied: In each case, 0.74 g (=0.0045 mol) of propyltrimethoxysilane was stirred into 250 ml of perchloroethylene and then, in one test, 0.493 g (=0,00145 mol) of butyl titanate monomer was added. This corresponds to a PTMO:BTM ratio of 6:40.

In a second test, 1.11 g (=0.00326 mol) of butyl titanate monomer was added to the PTMO solution. This quantity ratio amounted to 40:60. Then 1 mol (=193.8 g) of potato starch was stirred in, and the procedure of Examples 1 and 2 was followed out. The analysis values are given in the following table, while the values in 250 ml of perchlorethylene from Example 2 are also shown.

| Quantity ratio PTMO:BTM | Silane absorption per 100 g of starch | | |
|---|---|---|---|
|  | Theoretical % Si | Found % Si | % of theory |
| 80:20 (= Example 2) | 0.078 | 0.038 | 48.7 |
| 60:40 | 0.078 | 0.038 | 48.7 |
| 40:60 | 0.078 | 0.045 | 57.7 |

Both of the samples were subjected to the wetting test. The entire amount of the starch placed on the water remained floating on the surface for at least 24 hours. The pouring time in the 60:40 test was 32 seconds (the same as in the case of the 80:20 ratio in Example 2), and in the 40:60 test it was 36 seconds.

Example 5

The same procedure was followed as in Examples 1 and 2, except that, instead of propyltrimethoxysilane, 0.0045 mol (=1.06 g) of gamma-glycidyloxypropyltrimethoxysilane was dissolved in 610 ml of hexane in one case and perchlorethylene in the other. The amount of butyl titanate monomer added was 0.265 g in each case (=0.00078 mol). Again, 1 mol of potato starch was stirred in and the rest of the procedure was as described above.

The analyses are shown in the following table:

| Solvent | Silane absorption per 100 g of starch | | |
|---|---|---|---|
|  | Theoretical % Si | Found % Si | % of theory |
| Hexane | 0.078 | 0.035 | 44.9 |
| Perchlorethylene | 0.078 | 0.043 | 55.1 |

The pouring time in both tests was between 28 and 30 seconds.

Example 6

In this Example, 0.67 g (=0.0045 mol) of vinyltrimethoxysilane was stirred into 610 ml of hexane and 0.168 g (=0.00049 mol) of butyl titanate monomer, corresponding to the 80:20 quantity ratio, plus 1 mol (=193.8 g) of potato starch was added.

In the wetting test, the entire sample of the starch thus treated remained floating on the surface of the water for at least 24 hours, and the time required for the product to flow out of the Ford beaker was about 42 seconds.

Example 7

193.8 g (=1 mol) of potato starch was treated with 0.995 g (=0.0045 mol) gamma-aminopropyltriethoxysilane and 0.249 g (0.00073 mol) of butyl titanate monomer in 250 ml of perchlorethylene, in the manner described in Example 2. The silicon content of the starch obtained in this manner was 0.05%. On the basis of the available amount of silane, the theoretical silicon content of the starch is 0.078%, so that about 64% of the available silane was fixed by the starch. The dry pouring time in the Ford beaker with the 6 mm nozzle amounted to 33 seconds.

Example 8

In these tests, 1 mol (=193.8 g) of potato starch was treated in 610 ml of perchlorethylene to which 0.74 g (=0.0045 mol) of propyltrimethoxysilane had previously been added, using as the metallic acid ester 0.247 g (=0.00051 mol) of titanium acetyl acetonate (=75%) in the one test, and 0.226 g (=0.00048 mol) of zirconium butylate (=82%) in the second test.

Samples of the starches thus treated remained entirely floating on the surface of the water in the wetting test. The pouring time of these starches amounted to 29 and 32 seconds, respectively.

Example 9

The procedure of Example 1 was repeated, except that 1 mol (=182 g) of cornstarch was used instead of potato starch. The treatment was performed in 610 ml of perchloroethylene in which 0.74 g (=0.0045 mol) of propyltrimethoxysilane and 0.185 g (=0.00054 mol) of butyl titanate monomer had been dissolved.

Here, again, the result of the wetting test was that virtually no wetting took place over a period of at least 24 hours, and the starch thus treated did not sink to the bottom after it was placed on the water.

Example 10

In these tests, the procedure was the same as in Example 10, but instead of cornstarch, one mole (=202.5 g) of hydroxypropyl ether of oxidized potato starch was used in the one case, and one mole (=184 g) of water-soluble, nonionic starch ether was used. In the wetting test, both samples of the starches thus treated remained entirely floating on the water surface. The pouring time from the Ford beaker with the 6 mm nozzle amounted in the case of the hydroxypropylether to 29 seconds, and in the case of the starch ether to 45 seconds.

It will be understood that the specification and examples are illustrative but not limitative of the present invention and that other embodiments within the spirit and scope of the invention will suggest themselves to those skilled in the art.

We claim:

1. A method of modifying starch with organosilanes comprising contacting the starch with an organofunctional alkoxysilane or an alkylalkoxysilane in an organic solvent in the presence of metallic acid esters of metals of groups IVB and VB of the Periodic Table of the Elements.

2. The method of claim 1, wherein the organofunctional alkoxysilane or alkylalkoxy silane and the metallic acid ester are dissolved in the organic solvent to form a solution, the starch is suspended in said solution to form a suspension which is stirred at room temperature.

3. The method of claim 1, wherein the molar ratio of the organosilane to the metallic acid ester is between 1:9 and 9:1.

4. The method of claim 1, wherein the metallic acid esters are esters of titanic, zirconic or vanadic acids.

5. The method of claim 1, wherein the organosilanes are of the general formula

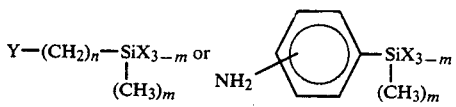

wherein Y is a substituted or unsubstituted amino group or a moiety from the group

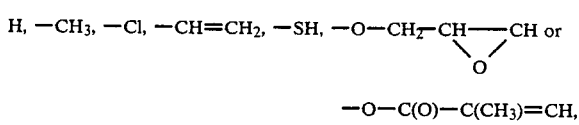

$$-O-C(O)-C(CH_3)=CH,$$

X is an alkoxy moiety having no more than 6 carbon-atoms, interrupted, if desired, by oxygen atoms, m can assume a value of 0 or 1 or 2, and n can assume the value of 1 or 2 or 3, as well as 0 in the case in which $Y = -CH=CH_2$.

6. The method of claim 1, wherein Y is substituted or unsubstituted amino and the substituents are $C_1$-$C_8$ alkyl moieties, aryl moieties, preferably the phenyl radical, cycloalkyl moieties; $-CH_2-CH_2NH_2$; or a quaternary ammonium salt.

* * * * *